INVENTOR.
SUMNER GORDON
BY
Lee I. Huntzberger
ATTORNEYS

INVENTOR.
SUMNER GORDON

BY

Lee I. Huntzberger
ATTORNEYS.

INVENTOR.
SUMNER GORDON
BY
Lee I. Huntzberger
ATTORNEYS

United States Patent Office 3,105,227

Patented Sept. 24, 1963

3,105,227

REPETITIVE SCANNING OF A DUAL RECORD TRACK ON A FRAGMENT OF A RECORD

Sumner Gordon, New London, Conn., assignor to the United States of America as represented by the Secretary of the Navy Filed Oct. 1, 1958, Ser. No. 764,730
11 Claims. (Cl. 340—174.1)
(Granted under Title 35, U.S. Code (1952), sec. 266)

Figure 1:
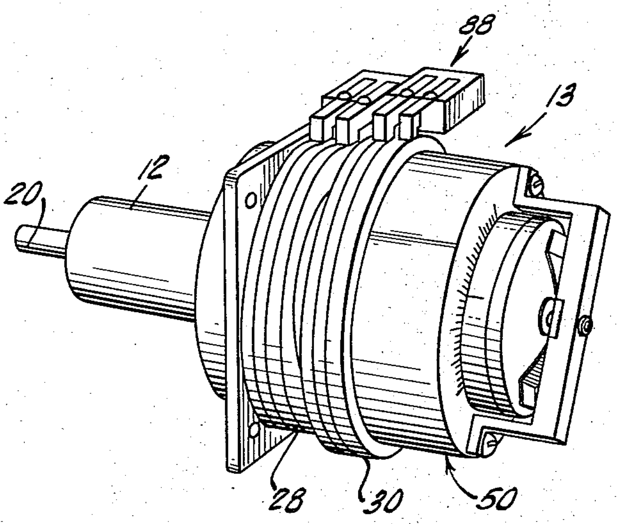

The invention described herein may be manufactured and used by or for the Government of the United States of America for governmental purposes without the payment of any royalties thereon or therefor.

This invention is related to the invention described in copending application Serial Number 760,274, filed September 10, 1958, now Patent No. 3,075,049, for Repetitive Scanning of a Record Track on a Fragment of a Record, by Sumner Gordon and William F. Saars. In such copending application, there is described an apparatus for repetitively scanning a selected portion of a single record track along a record medium where the selected portion of the record track does not close upon itself and where the record fragment having the selected portion of the record track is not physically dissociated from the remainder of the record medium. The apparatus in that application includes a plurality of magnetic heads for repetitively scanning the single record track on a selected portion of a tape by moving the record and the heads relative to one another so that the record track portion of interest is sensed at every instant in one narrow local zone which moves at a constant rate from one end of the record track to the other end of the record track and concurrently with the local zone leaving the record track at its other end, the local zone reappears at the one end of the track, the scanning action repeating continuously so that if the signal is visually displayed on an oscilloscope, the signal can be made to appear stationary to enable study of the signal. Because there is no gap or overlap in the repetitive sensing of the record track, the repeating signal can be accurately analyzed by electronic signal analyzers and also can be subjected to various signal processing techniques, including analog and digital techniques. The apparatus disclosed in the copending application includes a plurality of magnetic heads supported on a rotatable member with the heads equally spaced arcuately about the axis of the rotatable member for continuously scanning in succession a selected portion of a magnetic tape.

This invention concerns repetitively scanning concurrently a plurality of parallel side-by-side record tracks along a selected portion of a record medium where the tracks do not close upon themselves and where the selected portion of the record is not physically dissociated from the remainder of the record medium and also concerns the use thereof for stereo examination of a target and for enhancing the signal-to-noise ratio of marginal signals that are almost completely masked by white or random noise. More particularly, this invention concerns examination and correlation of signals recorded on two side-by-side parallel record tracks along a record medium such as magnetic tape without cutting the tape to isolate the portions of interest.

It is common practice at the present time to record signals emanating from various sources to enable scrutiny and detailed examination of the signals at a conveniently selected time and under selected conditions. Heart sounds, radar and sonar echoes, oil exploration echoes, radio signals from space, geophysical mapping pulse echoes, fish and bat signals are examples of the variety of signals that are recorded for detailed study. Magnetic tape and wire recorders are commonly used for recording such signals but there are other types of recorders currently available and which can record such signals; they record on disks, drums or belts and operate on magnetic, electrostatic, or modulated groove principles. Regardless of the type of recorder used, the signal is recorded along a continuous record track on the record medium. Recorded signals are reproduced from the record with the aid of suitable playback equipment by placing the sensing head of the playback equipment in sensing relation with the record track and moving the record and the sensing head relative to each other so that the sensing head traverses the record path. The sensing head generally can be brought into engagement with the record manually at any point along the record track and can be disengaged from the record track further along whereby it is a simple matter to play back a desired fragment of the record only. By marking points along the record track corresponding to the ends of the selected fragment, that fragment can be played back repeatedly by repeating the engaging and disengaging steps. By this method, a particular signal recorded on a fragment of a record can be observed over and over again at intervals with the aid of an oscilloscope or listened to over and over again with the aid of audio equipment.

Where the signal of interest has an irregular or complex waveform, it is not usually possible to analyze the signal if it is observed only transitorily at spaced intervals of time, as above, regardless of the number of times it is observed. It is necessary to present the signal waveform so that it is stationary on an oscilloscope screen, or equivalent. If the signal is displayed stationary on an oscilloscope screen, the signal can be studied but detailed study is facilitated and considerably furthered if the signal can be compared to a reference signal displayed alongside and adjacent to it. By comparison of related signals side-by-side a great deal more information can be obtained.

Where a signal is continuously repetitive without gaps or overlaps, it can be readily accurately analyzed by various electronic analyzers, but where the signal is repeatedly interrupted or where the successive repetitions of the selected signal overlap in part, electronic analyzers cannot provide accurate results. Also for various signal processing techniques including analog and digital techniques, control circuits, circuits that sense a marked discontinuity in background noise for signalling a new presence or change in an environment, a repetitive signal must not be altered by discontinuities such as gaps or overlaps.

An object of this invention is to continuously repeatedly scan concurrently a plurality of side-by-side parallel record tracks on a selected portion of a record without dissociating the record portion from the remainder of the record for the purpose of enabling the signals from the plural tracks to be displayed side-by-side on an oscilloscope screen and to adjust the phasing of the displayed signals to facilitate study thereof.

A further object of this invention is to obtain stereo signal information on a selected target.

Figure 3:
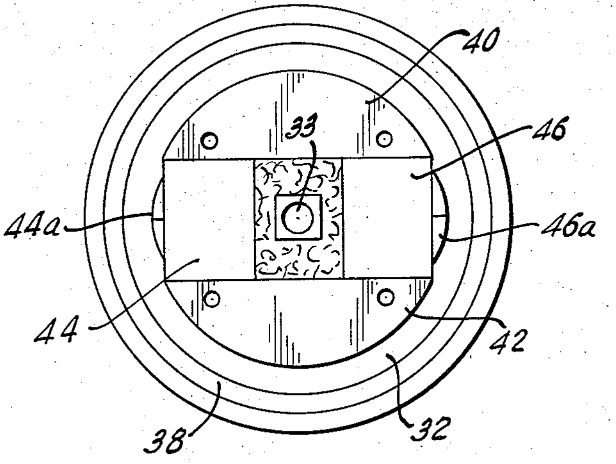
Figure 2:
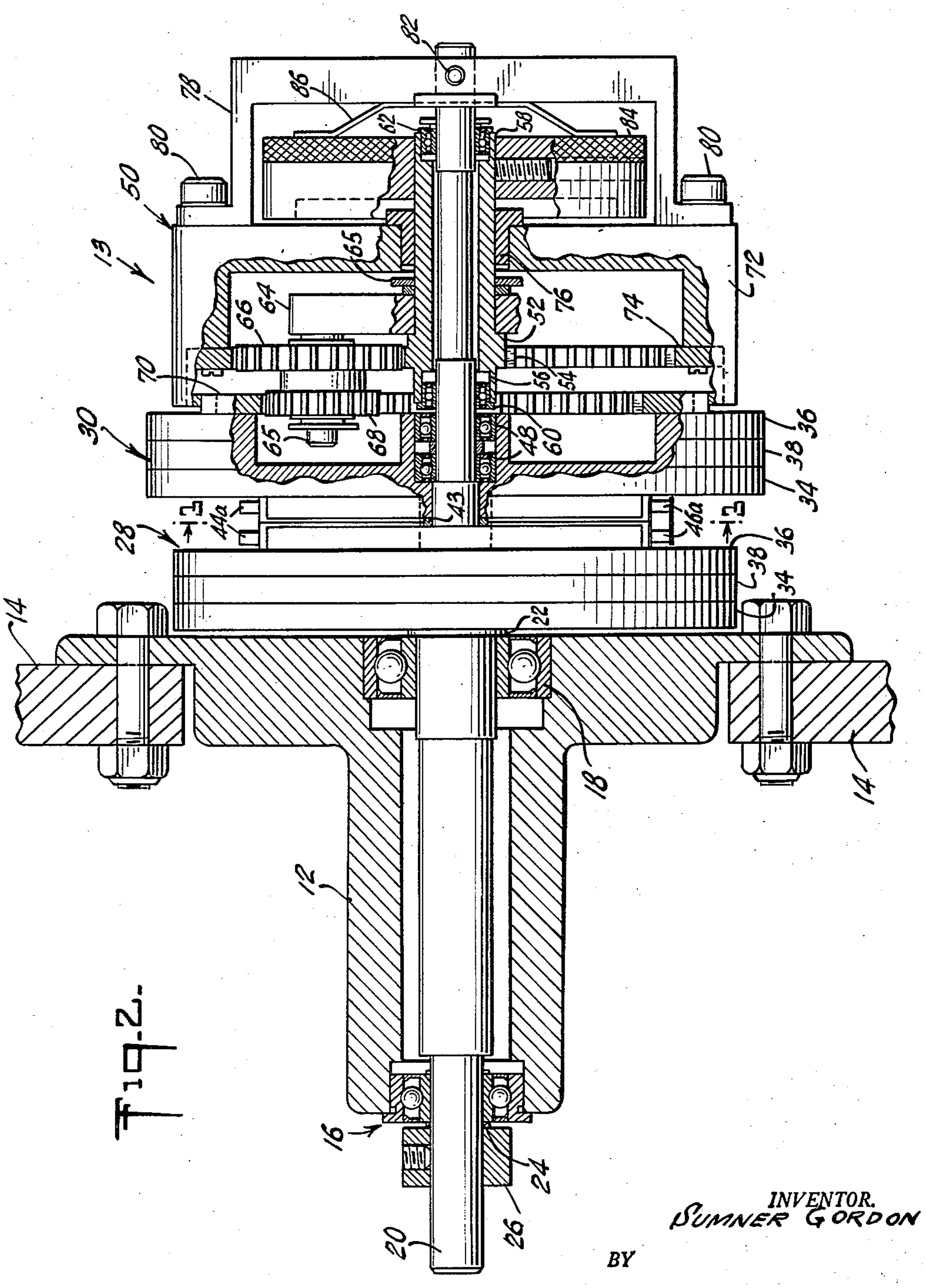
Figure 4:
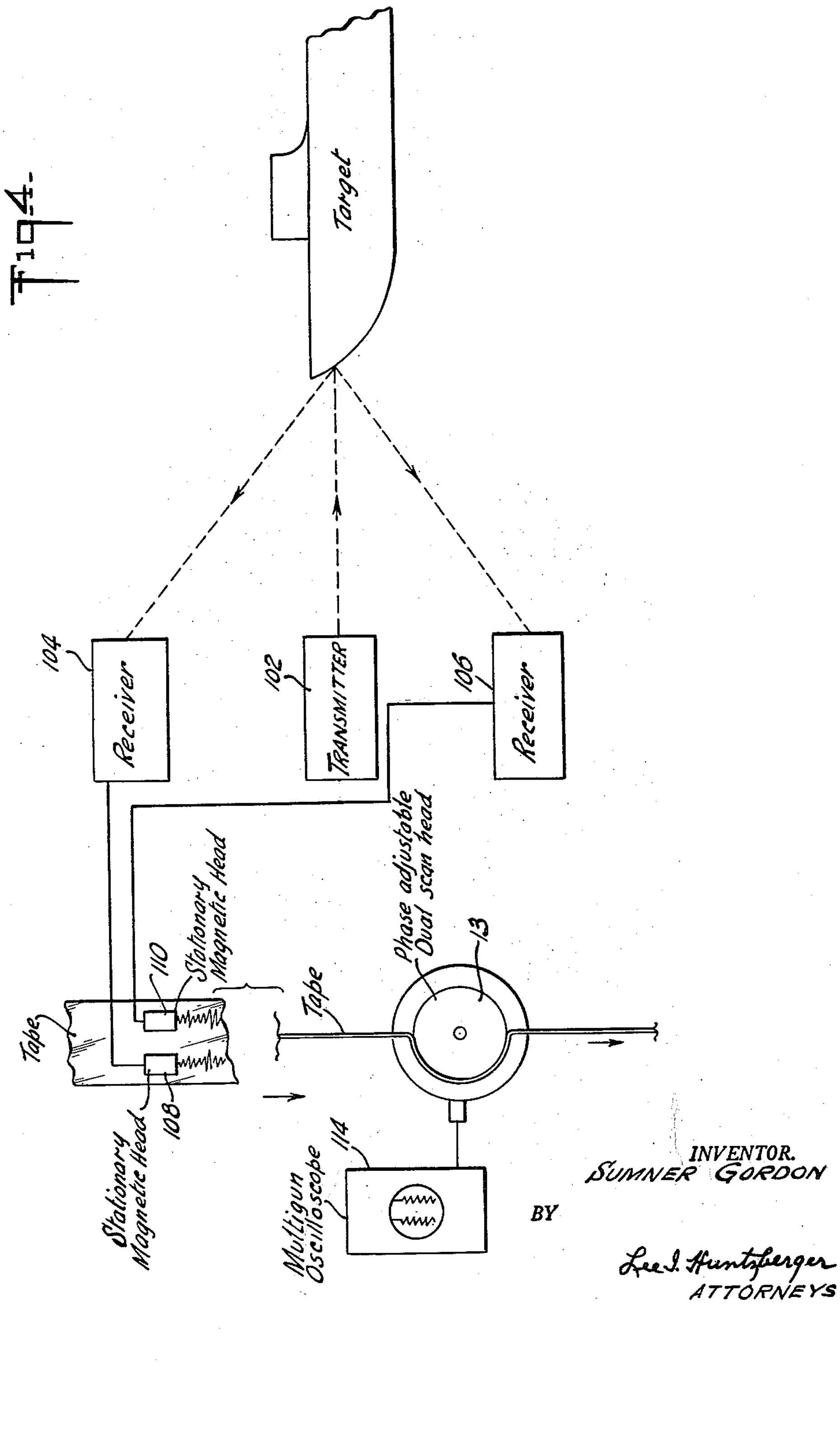

Other objects and many of the attendant advantages of this invention will be readily appreciated as the same becomes better understood by reference to the following detailed description when considered in connection with the accompanying drawings wherein:

FIG. 1 is a perspective view of a dual scan head in accordance with this invention, FIG. 2 is a side view partially in longitudinal section of the apparatus in FIG. 1 and on a larger scale, FIG. 3 is a section taken along line 3—3 of FIG. 2, and FIG. 4 illustrates a method utilizing the apparatus of FIGS. 1–3.

The embodiment of the invention shown in FIGS. 1, 2, and 3 is fabricated of elements which are non magnetic except for magnetic sensing heads. It includes a support 12 for mounting dual scan head 13 on a panel 14. Ball bearings 16 and 18 rotatably support a shaft 20 in the support 12; a step 22 on the shaft bears against the inner race of ball bearing 18 and locking collar 26 bears against the inner race of ball bearing 16 to prevent axial movement of the shaft relative to support 12. The drive means for shaft 20, not shown, corresponding to that in the above-mentioned copending application, is engageable with the end of the shaft 20 beyond locking collar 26.

A first scan unit 28 is part of an intermediate portion of the shaft 20 for rotation with the shaft and a second scan unit 30 is rotatably supported on the shaft contiguous with unit 28. Unit 30 includes a central circular recessed element 32 formed with an axial extension 33, and a pair of collector rings 34 and 36 secured through an annular insulator 38 to the periphery of the central element 32. Two flat D-sections 40 and 42 whose curved peripheral edges have identical radii of curvature are secured to the flat outer surface of each of the central elements 32 with the straight edges parallel to each other and with the curved edges concentric with the axis of rotation of elements 32. The curved surfaces of the D-sections 40 and 42 are polished because in operation they slidably engage magnetic tape. A miniature bearing 43 is disposed on the shaft 20 between the ends of axial extensions 33 and its thickness is such that the abutting surfaces of the two pairs of D-sections 40, 42 can slide relative to each other and are polished to facilitate relative face-to-face sliding movement about the axis of shaft 20.

A pair of magnetic sensing heads 44, 46 rectangularly packaged as shown in FIG. 3 are oppositely secured between D-sections 40 and 42 on each scan unit 28 and 30 with their pole faces spaced from the axis of central element 32 by a distance equal to the radius of curvature of D-sections 40 and 42. The magnetic heads are conventional, of high quality commercial variety whose pole tips 44*a* and 46*a* are small in the sensing direction and made arcuate with the same radius of curvature as the curved edges of D-sections 40 and 42. It is desirable that each pair of opposed magnetic heads be substantially identical mechanically in terms of weight distribution so as not to contribute to unbalance in the dual scan head, and the opposed magnetic heads have substantial identical transducing characteristics and are as nearly identical electrically as possible. A practical method of obtaining two magnetic heads with the necessary degree of identity is to obtain one or more dozen specimens of a selected high quality variety of magnetic head with small pole tips, ascertain the weight and the transducing and electrical characteristics of each, then select two pairs of magnetic heads which are most closely matched. Each matched pair of magnetic heads are secured to the central element 32 between the D-sections 40 and 42. The thickness of the D-sections is no less than the thickness of the magnetic heads 44 and 46. Opposed magnetic heads are mounted so that the pole tips are exactly in line with each other and with the axis and also so that the pole tips terminate on the circle which includes the arcuate peripheral edges of D-sections 40 and 42. An optical comparator can be used to align the pole tips. Bolt holes and clearances are made large enough to permit adjustment as is conventional. Each pair of opposed magentic heads 44, 46 are connected in series with each other and the two collector rings associated therewith.

The scan unit 30 is rotatably supported on shaft 20 contiguous with scan unit 28 by means of ball bearings 48. The thickness of the D-sections 40 and 42, the thickness of bearing 43, the lengths of extensions 33, and the axial spacing of the pairs of magnetic heads 44 and 46 are determined by the width of dual track magnetic tape to be scanned thereby and the transverse spacing of the dual tracks along the tape.

The scan unit 30 is coupled to shaft 20 for rotation therewith by an epicyclic gear mechanism 50 which permits selective arcuate adjustment of scan unit 30 relative to scan unit 28. The mechanism 50 includes a sleeve-like member 52 formed with gear teeth 54 and internally recessed at the ends 56, 58. Sleeve member 52 is rotatably mounted on shaft 20 by a ball bearing 60 at one end and a ball bearing 62 at its other end. A grip ring secures member 52 against axial shifting along shaft 20. A diametrically balanced arm 64 is rotatably mounted on sleeve 52 and retained against a shoulder thereof by a grip ring 65. To each end of arm 64 there is secured a shaft 65 parallel to the shaft 20 for rotatably supporting a pair of gears 66, 68 which are axially in line with each other and secured for rotation together. The gears 66 on opposite ends of cam 64 mesh with the gear teeth 54 on the sleeve member 52. An annular internal gear 70 is secured to the scan unit 30 for meshing engagement with the gears 68 on opposite ends of arm 64. Because the gear mechanism 50 rotates with the dual scan head 13 during scanning operation, the arm 64 and the gears 66, 68 thereon are made symmetrical relative to the axis of shaft 20. A cup-like member 72 to which is affixed an annular internal gear 74 for meshing engagement with the gears 66, is supported on sleeve member 52 by a bearing 76. The cup-like member 72 is secured to shaft 20 for rotation therewith by a U-shaped bracket 78 bolted thereto at 80 and centrally pinned at 82 to shaft 20. A knurled knob 84 is set-screw fastened to the sleeve member 52 between the U-shaped bracket 78 and the cup-shaped member 72. A spring 86 secured on the bracket 78 frictionally engages one surface of the knob 84. A fiducial mark on knob 84 and arcuate calibration markings on adjacent face of cup-like member 72 may be included as an aid in arcuate adjustment of scan unit 30 relative to scan unit 28.

A brush assembly 88 is secured to support 12 for wiping engagement with the two pairs of collector rings 34 and 36 for delivering the signals from the dual tracks through suitable amplifiers to a multigun oscilloscope for side-by-side display on the screen thereof or to other electronic equipment for signal analysis, signal processing, equipment control, or other purposes.

In operation when the support 12 is mounted on a panel 14 and the shaft 20 is driven, the scan units 28 and 30 rotate with the shaft 20. The spring 86 substantially precludes unsought arcuate displacement of scan unit 30 relative to scan unit 28. Selective arcuate adjustment is accomplished manually when the shaft 20 is stationary by gripping the cup-like member 50 with one hand and the knob 84 with the other and twisting one relative to the other. The dual scan head is operated in the manner described in the above-mentioned copending application Serial Number 760,274 mentioned above. During scanning, dual track magnetic tape is supported for sliding engagement with 180 degrees of the circular scan portions of the scan units 28 and 30 so that for each scan unit, only one magnetic head is in sensing engagement with the magnetic tape and concurrently with one magnetic head leaving sensing engagement with one track at one end of the magnetic tape the succeeding magnetic head begins sensing engagement with the other end of the 180 degree wrap of the magnetic tape.

In FIG. 4, there is shown a method for stereo examination of a target by utilizing the device shown in FIGS. 1–3. A transmitter 102 and two receivers 104, 106 spaced from one another are mounted in predetermined fixed positions. Signals from the receivers are coupled to record heads 108 and 110 respectively of a dual track magnetic tape recorder. Signals recorded on the tape are subsequently examined with the dual scan head 13 described above. The two signals from dual scan head 13 are coupled to a multigun oscilloscope 114 for examination side-by-side. The tape is fed past the dual scan head while the scan head is stationary until waveforms of interest appear on the oscilloscope screen. Then the tape is stopped and the scan head rotated to observe and study the stereo signal. To assist in comparison of one fragment of the stereo signal from one of the dual tracks with another fragment from the other of the dual tracks, one of the scan units is arcuately shifted relative to the other to bring the signal fragments into line. Where the tape speed during recording is known, and the amount of arcuate shift of one scan unit relative to the other scan unit needed for bringing signal fragments on both record tracks in line on the oscilloscope screen is known, a stereo image of the target in terms of waveforms is obtainable.

The described dual scan head is excellent for enhancing the signal-to-noise ratio of marginal signals. For example, where an underwater signal arrives from a point so far away that is substantially masked by the random distributed noise, the signal-to-noise ratio can be greatly increased with this equipment. The signal and noise is recorded on two distinct tracks of a tape. Then the apparatus described is employed to scan the section of tape where the existence of a signal is suspected; and the output of the two heads are combined and added. The heads are relatively adjusted as described above until the signal is enhanced as much as possible. The random distributed noise from both tracks in part cancels and in part adds but the resultant noise is random. However, when the desired signal on both tracks are in registration, the signal strength doubles whereby the marginal signal is converted into an easily recognizable and usable signal.

In general, the dual scan head enables detailed study of signals recorded side-by-side on dual tracks along an elongated flexible record medium. One track can record time signals, reference signals, one half a stereo signal, or another to increase the utility of information recorded on the other track. The phase shift feature of the dual scan head advances correlation of the dual track signals.

Obviously many modifications and variations of the present invention are possible in the light of the above teachings. It is therefore to be understood that within the scope of the appended claims the invention may be practiced otherwise than as specifically described.

I claim:

1. A signal scanning device for use in concurrently and repetitively scanning recorded signals on a non-closing selected length segment of an elongate record which has dual recording tracks arranged side by side and running lengthwise of the record with a predetermined uniform spacing therebetween, which comprises a pair of supports disposed side by side and mounted for repetitive movements of portions thereof along two closed paths respectively which are side by side with said predetermined uniform spacing therebetween for at least a distance equal to said selected length, a plurality of recorded signal sensing heads for transducing the recorded signals to electrical signals mounted on each of said supports in succession in the direction of movement of said portions of their supports and movable with their respective supports in succession along said two paths respectively, the heads on each support being identical in number to those on the other support, means coupling said supports for normal movement together and selectively and independently operable to adjust one of said supports relative to the other in the direction of movement of the supports to set the amount of displacement between the plurality of heads on one support relative to the plurality of heads on the other support along said paths, the spacing of successive heads on each support measured along the respective paths thereof being substantially equal to said selected length, whereby when said non-closing selected length segment of said elongate record is supported with its dual tracks contiguous and in registration with said two closed paths, as one head leaves sensing engagement with one end of either one of the dual tracks, another head begins sensing engagement with the other end of that track, means for collecting electric signals created by said heads as they move in succession along the dual tracks of said record segment for coupling the signals sensed from the dual tracks separately to selected electrical means to enable comparison or other applications of the signals from the dual tracks, and whereby the time displacement of the signals from the dual tracks are relatively adjustable by adjustment of the supports relative to each other.

2. A signal scanning device as defined in claim 1, wherein said supports are mounted for rotation about a common axis therethrough, and wherein the plurality of heads mounted on each of said supports are spaced apart arcuately about the axis of rotation by an amount equal to 360 degrees divided by the number of heads on the support.

3. A signal scanning device as defined in claim 2, wherein the plurality of heads on each support are magnetic and have substantially identical transducing characteristics and electrical characteristics and are connected in electrical series with one another and with the electrical signal collecting means therefor, and wherein the record sensing pole tips of the heads are of minimal width in the scan direction to minimize overlap of signals from a pair of successive heads on either of the two supports in scanning an arcuate record which extends for 360 degrees divided by the number of heads on each support.

4. A signal scanning device for use in concurrently and repetitively scanning signal recordings on a selected length segment of an elongate flexible record which has dual recording tracks arranged side by side spaced a uniform distance apart and running in a direction lengthwise of said record, which comprises two rotatable supports arranged side by side and rotating about a common axis, means fixedly coupling said supports for rotation together and selectively and independently operable for angular adjustment of one relative to the other about said axis, a plurality of pickup heads that have substantially identical transducing characteristics and electrical characteristics mounted in succession on each of said supports at a radial distance from said common axis to sweep along two circular paths spaced apart axially by a distance approximately equal to the spacing of the tracks of said elongate record, said heads on each support being equal in number to those on the other support and those on each support being connected in series and angularly spaced apart on their support a distance of travel substantially equal to said selected length and to 360 degrees divided by their number, whereby when said selected length segment of said elongate flexible record is supported arcuately with its tracks contiguous with the respective circular paths of said pickup heads, as one head on either support just starts scanning along one end of said selected length segment the next adjacent but leading head on the same support just passes beyond the other end of said segment, means for separately collecting electric signals from the respective tracks created by said heads as they move along said arcuately arranged record segment for transferring the separate signals to selected electrical means, the relative phasing of the signals sensed from the respective tracks being adjustable by angular adjustment of the support means relative to each other.

5. A plural track rotatable magnetic scan head assembly for use in continuously repetitively scanning a selected segment of an elongate flexible magnetic record medium supported in arcuate configuration and that has plural recording tracks substantially side-by-side running lengthwise along the medium, said assembly comprising a plurality of scan head supporting members, a plurality of series-connected magnetic pickup heads that have transducing characteristics and electrical characteristics that are mutually substantially identical and that have record sensing pole tips whose face areas are of minimal width in the scan direction on each of said scan head supporting members, means supported for rotation about an axis therethrough, said scan heads supporting members being supported by said rotatable means with said pole tips radial with respect to said axis and with the faces of all said pole tips equidistant from said axis and with the centers of the pole tips of the pluralities of magnetic heads being in planes respectively that are normal to the axis and spaced apart by a distance for spanning the recording tracks of said record medium and with the centers of said pole tips of each plurality of magnetic heads being arcuately spaced apart about said axis by an angle equal to 360 degrees divided by the number of each plurality of magnetic heads, and separate electrical means on said magnetic head support means for delivering separate electrical signals from said pluralities of magnetic heads respectively, a record segment support means for supporting a record segment contiguous with said circular paths for an arcuate distance equal to 360 degrees divided by the number of magnetic heads in each plurality of heads, whereby when a segment of an elongate magnetic record medium having a plurality of recording tracks spaced apart by an amount corresponding to the spacing of said pluralities of magnetic heads axially of said rotatable means is supported in arcuate configuration contiguous with the circular paths of the pole tips of said pluralities of magnetic heads for an arcuate distance equal to 360 degrees divided by the number of magnetic heads in each plurality, and said means is rotated, the pole tips of each plurality scan the respective ones of the two record tracks in succession with substantially no gap or overlap between successive scans by successive heads, and any signal on any track in that segment is delivered by said electrical means at a repetition rate which is equal to the rotational rate of said member multiplied by the number of said magnetic heads in each said plurality of heads.

6. A dual track rotatable magnetic scan head assembly as defined in claim 5, wherein said rotatable means supporting said scan head supporting members includes an adjustment for selectively displacing arcuately about said axis said head supporting means for adjusting the relative phasing of signals from said pluralities of heads to aid in correlation studies of the signals.

7. The method of stereo viewing a target which comprises sending a signal to a selected target, transducing reflections of said signal from said target at stations spaced from each other and from said target, into electric signals, concurrently recording said electric signals side-by-side on transversely aligned zones moving lengthwise at a constant rate along an extensive strip-like record medium to form respective parallel record tracks lengthwise along the record medium, then concurrently and repetitively reproducing continuously as independent electric signals and in any selected phase relationship with respect to one another, selected transversely aligned recordings on a selected length fragment of said record medium, to enable one to compare such concurrently reproduced signals without cutting said medium.

8. The method of stereo viewing a target as defined in claim 7, further comprising adjusting the relative phasing of the reproduced independent electrical signals to aid in correlation of the signals.

9. A signal scanning device for use in concurrently and repetitively scanning recorded signals on a non-closing selected length segment of an elongate record which has a number of recording tracks side by side and running lengthwise of the record with predetermined spacings between adjacent tracks, and wherein each spacing is uniform along the tracks, which comprises a number of supports disposed side by side and mounted for repetitive movements of portions thereof along respective closed paths which are side by side and laterally spaced apart corresponding to the spacing of said tracks, along said paths for at least a distance equal to said selected length, a plurality of recorded signal sensing heads for transducing the recorded signals to electrical signals mounted on each of said supports in succession in the direction of movement of said portions of their supports and movable with their respective supports in succession along said paths respectively, the number of sensing heads on each support being identical, the spacing of successive heads on each support measured along the respective paths thereof being substantially equal to said selected length, whereby when a non-closing segment of said selected length of said elongate record is supported with its number of tracks contiguous with the respective closed paths, as one sensing head leaves sensing engagement with one end of a track another head concurrently begins sensing engagement with the other end of that track, means for collecting electric signals created by said heads as they move in succession along the corresponding tracks of said record segment for coupling the signals sensed from the number of tracks separately to selected electrical means, means fixedly coupling said supports for normal movement together and selectively and independently operable to adjustably advance or retard one support relative to the others in the direction of movement of the supports by any amount ranging up to at least the spacing of successive heads, whereby the time relationships of the signals from the tracks are relatively adjustable by adjustment of the supports relative to each other.

10. The method of continuously repetitively scanning a fraction of a record medium having several side-by-side record tracks therealong which do not close upon themselves which comprises sensing in one local zone along each of the several tracks, moving the local sensing zones at substantially identical speed along the respective record tracks from end-to-end, scanning each track repetitively and continuously by commencing to sense in a local zone at one end of the respective track in coincidence with moving a local sensing zone off the other end of the track, and separately collecting any signals sensed from the several tracks during the movement of the local zones along the tracks.

11. The method of continuously repetitively scanning a fraction of a record medium as defined in claim 10, further including adjusting relatively the local zones on the several tracks for relatively shifting the time relationship of the signals from the several tracks to aid in correlation studies thereof.

References Cited in the file of this patent

UNITED STATES PATENTS

| | | |
|---|---|---|
| 2,628,689 | Rieber | Feb. 17, 1953 |
| 2,751,439 | Burton | June 19, 1956 |
| 2,755,422 | Livingston | July 17, 1956 |
| 2,831,069 | Show | Apr. 15, 1958 |
| 2,832,840 | Morin | Apr. 29, 1958 |
| 2,845,495 | Lyon | July 29, 1958 |
| 2,968,798 | Drukey | Jan. 17, 1961 |